UNITED STATES PATENT OFFICE.

WILLIAM MAGEE, OF JAMAICA, NEW YORK.

IMPROVEMENT IN ALLOYS FOR THE MANUFACTURE OF PLOW MOLD-BOARDS.

Specification forming part of Letters Patent No. 119,091, dated September 19, 1871.

*To all whom it may concern:*

Be it known that I, WILLIAM MAGEE, of Jamaica, in the county of Queens and State of New York, have invented certain new and useful Improvements in Alloys for the Manufacture of Mold-Boards, &c., for Plows, of which the following is a full, clear, and exact description:

My invention consists in constructing the mold-boards, shares, and such other metallic portions of the plow or cultivator as are brought in direct contact with the soil, of a composition or alloy consisting of copper, tin, and zinc or spelter, when these ingredients are used in such relative proportions that the fundamental basis of the alloy shall be copper, and with only a sufficient quantity of zinc added to prevent the composition oxidizing or becoming oxidated.

I am well aware that experiments aiming to attain the result accomplished by my invention have been made with alloys the chief ingredients of which were zinc, tin, copper, and antimony or lead; but these alloys in every instance when used for the purpose stated, have proved impracticable, and which has invariably been due to the fact that zinc was always made the primary ingredient or basis of said compositions, it being used with the other ingredients in such proportion as to leave seventy or eighty parts of zinc. The result has been, and practical experience has time and again demonstrated the fact, that the mold-board or share when manufactured out of such compositions, owing to the vast preponderance of zinc, was so exceedingly brittle as to render it valueless for agricultural purposes. With my invention the composition contains the smallest possible quantity of zinc, this ingredient not being used by me as the basis for the same, but simply as an agent whose chemical action on the other metals is such as to prevent their ever becoming oxidated.

My composition or alloy is, as I have said, composed of the following ingredients, and which are used usually in this proportion: Copper, eighty-five parts; tin, twelve parts; zinc, three parts. Of course, this formula may be slightly varied without materially affecting the value of the alloy, but it must only be so varied as to still preserve the great preponderance of copper; this metal never being used in a less proportion than this—six-tenths of the entire composition being copper.

The process of forming the alloy is as follows: In an ordinary furnace, cupola, or other suitable vessel is first introduced the copper. When this begins to melt or fuse the zinc is introduced and the mass thoroughly agitated; then the tin is introduced and the whole subjected to repeated agitation. This is continued until such a degree of fusibility is attained that the molten composition will pour off at about the consistency of ordinary oil.

The details of the process as herein given are important and should not be disregarded, for if the metals are introduced into the cupola together, owing to the fact that tin melts at a so much less heat than copper, the thorough amalgamation of the metals, in the manner required to effect the desired result, does not ensue.

This composition, consisting of the ingredients named and treated by a process similar to that described, practical experience has fully shown is admirably adapted for the purposes stated; as mold-boards, shares, &c., when manufactured of said composition, have proved by practical experiment to be most durable, ductile, or presenting sufficient flexibility without being brittle, and also presenting such a non-adhesive face that the soil does not accummulate or bake thereon.

What I claim as new, and desire to secure by Letters Patent of the United States, is—

The composition, consisting of the ingredients herein stated, used in such proportions as to secure the positive preponderance of copper so that this metal shall form the basis of the alloy, substantially as described, as and for the purpose stated.

In testimony whereof I have signed my name to this specification in the presence of two subscribing witnesses.

WILLIAM MAGEE.

Witnesses:
JOS. T. K. PLANT,
EDWIN JAMES.

(84.)